(12) United States Patent (10) Patent No.: US 9,215,108 B2
Amamiya (45) Date of Patent: Dec. 15, 2015

(54) DECISION FEEDBACK EQUALIZER

(71) Applicant: Renesas Electronics Corporation, Kawasaki-shi, Kanagawa (JP)

(72) Inventor: Yasushi Amamiya, Kanagawa (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

(21) Appl. No.: 14/795,888

(22) Filed: Jul. 9, 2015

(65) Prior Publication Data

US 2015/0319019 A1 Nov. 5, 2015

Related U.S. Application Data

(63) Continuation of application No. 14/594,107, filed on Jan. 10, 2015, now Pat. No. 9,112,740, which is a continuation of application No. 13/981,914, filed as application No. PCT/JP2012/051409 on Jan. 24, 2012, now Pat. No. 8,953,669.

(30) Foreign Application Priority Data

Jan. 26, 2011 (JP) ................................. 2011-013956

(51) Int. Cl.
*H03H 7/30* (2006.01)
*H03H 7/40* (2006.01)
(Continued)

(52) U.S. Cl.
CPC .... *H04L 25/03267* (2013.01); *H04L 25/03057* (2013.01); *H04L 25/03197* (2013.01)

(58) Field of Classification Search
CPC ................... H04L 25/03267; H04L 25/03057; H04L 25/03197
See application file for complete search history.

(56) References Cited

U.S. PATENT DOCUMENTS 6,161,001 A 12/2000 Iinuma
6,697,350 B2 2/2004 Lomp
(Continued)

FOREIGN PATENT DOCUMENTS

JP 06-204902 A 7/1994
JP 08-204624 A 8/1996
WO WO 2008/041609 A1 4/2008

OTHER PUBLICATIONS

Payne, Robert et al., "A 6.25Gb/ s binary adaptive DFE with first post-cursor tap cancellation for serial backplane communications", 2005 IEEE International Solid-State Circuits Conference, 2005, Digest of Technical Papers, ISSC., Feb. 10, 2005, vol. 1, pp. 68, 69, 585.

(Continued)

*Primary Examiner* — Erin File
(74) *Attorney, Agent, or Firm* — Miles & Stockbridge P.C.

(57) ABSTRACT

A decision feedback equalizer that can operate at higher speed is provided. The decision feedback equalizer includes a weighting addition circuit (adder 21, coefficient units Tap1$a$, Tap2 to Tapn) that sums an input signal to weighted versions of feedback signals FB1 to FBn, n being an integer not less than 2. The decision feedback equalizer also includes a decision circuit 11 that decides whether or not the result of addition by the weighting addition circuit is not less than a defined threshold value and that outputs the result of the decision to outside and to a shift register (latch circuits L2 to Ln). The decision circuit operates in synchronism with a clock signal. The shift register sequentially holds the result of decision of the decision circuit 11 in synchronism with the clock signal, and outputs the contents held by its component registers as feedback signals FB2 to FBn. The decision feedback equalizer includes a decision circuit 12 that decides whether or not the result of addition by the weighting addition circuit is not less than a defined threshold value and that outputs the result of decision as feedback signal FB1. The second decision circuit operates in synchronism with the clock signal.

10 Claims, 13 Drawing Sheets

(51) Int. Cl.
*H03K 5/159* (2006.01)
*H04L 25/03* (2006.01)

(56) References Cited

U.S. PATENT DOCUMENTS

| | | |
|---|---|---|
| 6,744,893 B1 | 6/2004 | Fleming-Dahl |
| 7,224,758 B1 * | 5/2007 | Banister ........................ 375/358 |
| 7,298,696 B1 | 11/2007 | Wu |
| 7,738,602 B2 | 6/2010 | Langenbach et al. |
| 7,792,187 B2 | 9/2010 | Bulzacchelli |
| 7,924,912 B1 | 4/2011 | Rokhsaz et al. |
| 2002/0141513 A1 | 10/2002 | England |
| 2004/0013209 A1 | 1/2004 | Zehavi et al. |
| 2006/0164270 A1 * | 7/2006 | Miller et al. .................. 341/143 |
| 2009/0319854 A1 * | 12/2009 | Qian et al. .................... 714/750 |
| 2010/0046683 A1 | 2/2010 | Beukema et al. |
| 2012/0190420 A1 | 7/2012 | We et al. |
| 2013/0308694 A1 * | 11/2013 | Amamiya ..................... 375/233 |

OTHER PUBLICATIONS

Wang, Bo et al., "A programmable pre-cursor ISI equalization circuit for high-speed serial link over highly lossy backplane channel", Canadian Conference on Electrical and Computer Engineering, 2009, CCECE '09, May 3, 2009, pp. 1221-1226.

Garg, Adesh et al., A 1-Tap 40-Gb/s Look-Ahead Decision Feedback Equalizer in 0.18-um SiGe BiCMOS Technology, IEEE Journal of Solid-State Circuits, Oct. 2006, vol. 41, Issue 10, pp. 2224-2232.

Sridhara, Srinivasa R. et al., "Joint Equalization and Coding for On-Chip Bus Communication", IEEE Transactions on Very Large Scale Integration (VLSI) Systems, vol. 16, Issue 3, IEEE, Mar. 2008, pp. 314-318.

* cited by examiner

DECISION FEEDBACK EQUALIZER

CROSS-REFERENCE TO RELATED APPLICATION

The present application asserts priority rights based on JP Patent Application No. 2011-013956 filed on Jan. 26, 2011. The total contents of disclosure of the Patent Application of the senior filing date are to be incorporated by reference into the present Application.

TECHNICAL FIELD

This invention relates to a decision feedback equalizer and, more particularly, to a technique for enabling a high-speed operation of the decision feedback equalizer.

BACKGROUND

Recently, speedup in data communication is progressing in a large variety of electronic devices, such as server network devices, mobile phones, storage devices, OA devices or domestic electrical or electronic utensils. In addition, a high-speed operation is preferred in data communication among different ones of the electronic devices. In signal transmission in such high-speed communication, severe signal distortion is liable to occur due to inter-symbol interference, sometimes abbreviated to ISI below, or due to noise. Thus, an equalizing technique to correct the signal waveform has been a desideratum. Inter alia, the decision feedback equalizer, sometimes abbreviated to DFE below, may be used to good effect to remove the ISI, and is now in use in e.g., the wireless signal receiving technique (see Patent Literature 1).

FIG. 10 depicts a block diagram showing the configuration of a customary decision feedback equalizer disclosed in e.g., Patent Literature 1. The decision feedback equalizer includes an adder 121, a decision circuit 111, a plurality of latch circuits L12 to L1$n$, $n$ being an integer not less than 2, a plurality of coefficient units Tap11 to Tap1$n$, and an output amplifier 132. The adder 121 adds a feedback signal to a received signal, entered thereto via an input amplifier 131, or subtracts the feedback signal from the received signal. The decision circuit 111 decides an output addition signal of the adder 121 to be "1" or "0", and the latch circuits L12 to L1$n$ are connected together in cascade to sequentially shift the results of the decision. The coefficient units Tap11 to Tap1$n$ operate to multiply the outputs of the decision circuit 111 and the latch circuits L12 to L1$n$ with weighting coefficients (tap coefficients), and the output amplifier 132 outputs the results of the decision of the decision circuit 111 to outside. The adder 121 receives outputs of the coefficient units Tap11 to Tap1$n$ as feedback signals.

The above described decision feedback equalizer uses a multi-tap configuration that applies a plurality of feedback processing operations to signals preceding the current signal by one, two, three, . . . , $n$ periods to remove the signal interference by retrogressing not only to the directly previous signal but also to the multiple previous signals. Note that the signal interference previous to the current signal by $k$ periods, where $k$ is 1 to $n$, is termed $k$th-post.

Among the methods for setting tap coefficients of respective feedback paths, there are a method of setting fixed values, decided from the outset depending on transmission characteristics, and a method of adaptively controlling the coefficient units to reduce as much as possible an error signal ϵ of an error detector 114 that compares input and output signals of the decision circuit 111. Any of these methods may be used to realize proper waveform equalization.

JP Patent Kokai JP-A-6-204902

SUMMARY

The entire disclosed contents of the above mentioned Patent Literature is incorporated herein by reference.

The following analysis is given by the present invention.

If, in the decision feedback equalizer, the transmission speed is to be made faster, the delay time on the feedback path may be longer than an optimum delay time, as needed for equalizing processing, due to the delay time on a feedback path constituting circuit. This very fact imposes limitations on the transmission speed. Inter alia, in the feedback path (P1 of FIG. 10) configured to remove signal interference at a directly previous time period, referred to below as 1st-post, the signal needs to be fed back within one signal period. Hence, the delay time of the 1st-post limits the operating speed of the decision feedback equalizer.

It is an object of the present invention to provide a decision feedback equalizer capable of operating at a higher speed.

The present inventor has directed attention to the fact that it is the circuit load in the feedback path that is responsible for protracted delay time in the 1st-post feedback path which imposes restrictions on the operating speed of the decision feedback equalizer. The present inventors accordingly have been led to the information that, by providing a devoted 1st-post feedback path independently of the main signal paths for the 2nd-post and so forth, it is possible to moderate the circuit load of the 1st-post feedback path to enable a higher operating speed of the decision feedback equalizer.

A decision feedback equalizer in one aspect (phase) of the present invention comprises a first weighting addition circuit that sums an input signal and weighted versions of first to nth feedback signals together, n being an integer not less than 2, and a first decision circuit that decides whether or not the result of addition by the first weighting addition circuit is not less than a defined threshold value and that outputs the result of decision to outside and to a shift register. The first decision circuit operates in synchronism with a clock signal. The shift register sequentially holds the result of decision of the first decision circuit in synchronism with the clock signal, and outputs the contents held by its component registers as the second to nth feedback signals, respectively. The decision feedback equalizer also includes a second decision circuit that decides whether or not the result of addition by the first weighting addition circuit is not less than a defined threshold value and that outputs the result of decision as the first feedback signal. The second decision circuit operates in synchronism with the clock signal.

The present invention may implement a decision feedback equalizer capable of operating at a higher operating speed.

PREFERRED MODES

Figure 1:
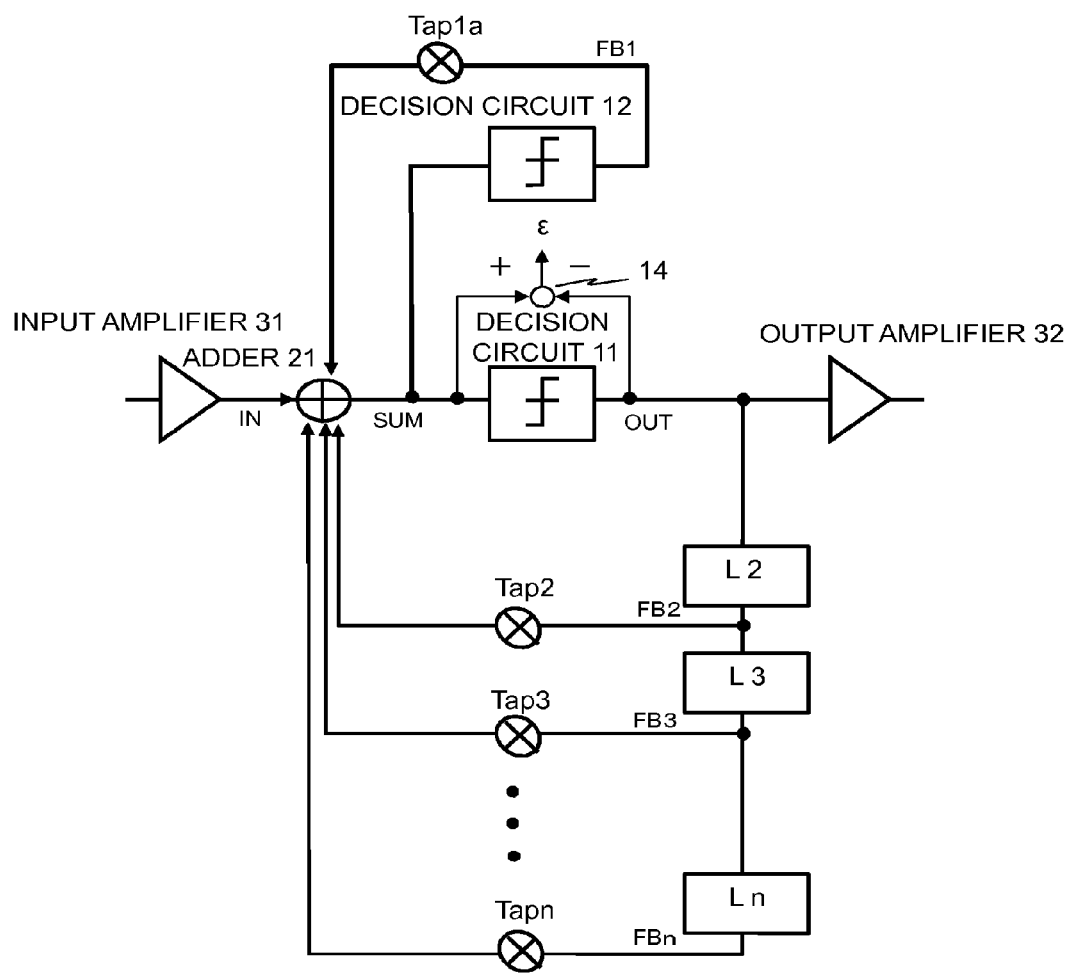
FIG. 1 is a block diagram showing a configuration of a decision feedback equalizer according to Example 1 of the present invention.

Modes for carrying out the present invention will now be schematically described. It should be noted that reference symbols for reference to the drawings, as used in the following description of the preferred modes, are only for assisting in the understanding and are not intended to limit the invention to the modes illustrated.

A decision feedback equalizer according to an exemplary embodiment of the present invention comprises a first weighting addition circuit (equivalent to 21, Tap1a, Tap2 to Tapn in FIG. 1) that sums an input signal and weighted versions of first to nth feedback signals together, n being an integer not less than 2. The decision feedback equalizer also comprises a first decision circuit (11 of FIG. 1) that decides whether or not the result of addition by the first weighting addition circuit is not less than a defined threshold value and that outputs the result of the decision to outside and to a shift register (equivalent to L2 to Ln of FIG. 1). The first decision circuit operates in synchronism with a clock signal. The shift register sequentially holds the result of the decision of the first decision circuit in synchronism with the clock signal and outputs the contents held by its component registers as the second to nth feedback signals. The decision feedback equalizer additionally comprises a second decision circuit (12 of FIG. 1) that decides whether or not the result of the addition by the first weighting addition circuit is not less than a defined threshold value and that outputs the result of the decision as the first feedback signal. The second decision circuit operates in synchronism with the clock signal.

In the decision feedback equalizer, preferably the second decision circuit is constructed with circuit constants different from those of the first decision circuit so that the second decision circuit will operate at a speed higher than that of the first decision circuit.

In the decision feedback equalizer, at least a part of transistors constituting the second decision circuit preferably has a size smaller than the transistors constituting the first decision circuit.

In the decision feedback equalizer, the first decision circuit and the second decision circuit each preferably include a data holding part (equivalent to T3, T4, T9, T10 of FIG. 3) that holds the result of the addition and that is in operation by the clock signal. The transistor constituting the data holding part of the second decision circuit is preferably smaller in size than the transistor constituting the data holding part of the first decision circuit.

In the decision feedback equalizer, preferably the second decision circuit is configured for operating with a logic amplitude lesser than that of the first decision circuit.

In the decision feedback equalizer, the first decision circuit and the second decision circuit each preferably include a data holding part that holds the result of the addition and that operates with the clock signal. Preferably, a load resistor(s) (R1, R2, R3, R4 of FIG. 3) constituting the data holding part of the second decision circuit is lower in a resistance value than a load resistor constituting the data holding part of the first decision circuit.

The decision feedback equalizer preferably further comprises a weighting means (Tap1 of FIG. 5) for applying to the result of decision by the first decision circuit a weighting equivalent to a weighting applied to the first feedback signal. Preferably, the first weighting addition circuit further adds an output signal of the weighting means. Preferably, control is managed so as to supply power exclusively to the weighting means or to both the second decision circuit and a weighting function for the first feedback signal.

The decision feedback equalizer preferably further comprises a second weighting addition circuit (equivalent to 22, Tap1a, Tap2 to Tapn of FIG. 6) that adds together the input signal and weighted versions of the first to nth (n being an integer not less than 2) feedback signals, respectively. Preferably, the second decision circuit checks whether or not the result of decision of the second weighting addition circuit is not less than a defined threshold value instead of checking the result of the addition by the first weighting addition circuit.

In the decision feedback equalizer, preferably a transistor constituting the second weighting addition circuit is smaller in size than a transistor constituting the first weighting addition circuit.

In the decision feedback equalizer, preferably the first decision circuit (11a of FIG. 7) is configured so that the defined threshold value is controllable by a weighted version of the first feedback signal. Preferably, the first weighting addition circuit (equivalent to 21b and Tap2 to Tapn of FIG. 7) sums the input signal and weighted versions of the second to nth (n being an integer not less than 2) feedback signals, respectively, together without adding a weighted version of the first feedback signal.

In the decision feedback equalizer, preferably the second decision circuit (12a of FIG. 9) is configured so that the defined threshold value is controllable by the weighted version of the first feedback signal.

Each of the decision feedback equalizers of the type defined above includes, apart from a main signal path whose principal components are a multi-tap decision feedback equalizer of the 2nd-post and so forth and the output amplifier, a feedback path that is devoted to the 1st post feedback and which is arranged in a side-by-side relation to the main signal path. The feedback path devoted to the 1st post feedback is made up of a second decision circuit having an output signal of the weighting addition circuit as input and a weighting means (coefficient unit) for the 1st-post feedback. An output end of the second decision circuit is connected only to an input part of the weighting addition circuit via the weighting means (coefficient unit). Hence, the output load of the feedback path devoted to the 1st post feedback may be moderated, in its connection configuration, thus reducing the feedback delay time to provide for a faster operation of the decision feedback equalizer.

In the explanation to follow, certain Examples of the present invention will be detailed with reference to the drawings.

Example 1

FIG. 1 depicts a block diagram showing a configuration of a decision feedback equalizer according to Example 1 of the present invention. In FIG. 1, the decision feedback equalizer includes decision circuits 11, 12, an adder 21, an input amplifier 31, an output amplifier 32, coefficient units Tap1a and Tap2 to Tapn, where n denotes an integer not less than 2, latch circuits L2 to Ln and an error detector 14.

The input amplifier 31 amplifies a signal, entered from outside so as to be equalized, and outputs the amplified signal as signal IN to the adder 21.

The adder 21 sums the signal IN and feedback signals FB1 to FBn, weighted respectively by the coefficient units Tap1a and Tap2 to Tapn, together to output the result of the addition as a signal SUM.

The decision circuit 11 is run in operation, in synchronism with a clock signal, not shown, to decide whether or not the signal SUM is not less than a defined threshold value. The decision circuit 11 then outputs the result of the decision as a signal OUT.

The output amplifier 32 amplifies the signal OUT to output the amplified signal to outside.

The latch circuits L2 to Ln are signal detection circuits that latch respective input signals in synchronism with a clock signal, not shown. The latch circuits L2 to Ln are implemented by flipflops or sampling latches and are connected together in cascade to form a shift register. The latch circuits L2 to Ln sequentially shift an input signal OUT to output the feedback signals FB2 to FBn to the coefficient units Tap2 to Tapn, respectively.

The decision circuit 12 is in operation in synchronism with a clock signal, not shown, to decide whether or not the signal SUM is not less than the defined threshold value. The decision circuit 12 outputs the result of the decision as the feedback signal FB1 to the coefficient unit Tap1a.

The error detector 14 outputs an error signal ε between the signal SUM and the signal OUT.

The coefficient units Tap1a, Tap2 to Tapn may change the respective weighting coefficients depending on the error signal ε. Or, the weighting coefficients may be decided from the outset, based on the results of equalizing processing of the subject signal, in which case the error detector 14 may be dispensed with.

The decision feedback equalizer, described above, is a decision feedback equalizer with the number of taps equal to n, and is configured like the conventional DFE insofar as the 2nd-post path and so on are concerned. That is, the adder 21 is provided on the trailing end side of the input amplifier 31 that inputs a signal. An output signal of the adder 21 is output to a next stage functional block, such as DMUX, via the decision circuit 11 which decides the output signal of the adder 21 to be a digital signal equal to either "1" or "0". In FIG. 1, the output amplifier 32 is provided at an output end.

From an output of the decision circuit 11, there are provided a plurality of feedback paths of 2nd-post, 3rd-post, . . . , nth post to feed back data delayed by two periods, three periods, . . . , n periods, respectively, of the clock signal to the adder 21. That is, the signal OUT from the decision circuit 11 is sequentially shifted, in synchronism with the clock signal, to the latch circuit L2, thence to the latch circuit L3 and so force down to the latch circuit Ln. These latch circuits provide feedback delays for the 2nd-post et seq. Output feedback signals FB2 to FBn of the latch circuits L2 to Ln are then multiplied by weighting coefficients of the coefficient units Tap2 to Tapn, respectively. The resulting signals are fed back to the adder 21 which then performs addition/subtraction by way of performing the waveform equalizing processing.

On the other hand, the 1st-post feedback is via a feedback path different and independent from the feedback paths of the 2nd-post down to the nth post. Specifically, a decision circuit 12 that checks output data of the adder 21 is provided apart from and in a side-by-side relation to the decision circuit 11. A feedback signal FB1, output data of the decision circuit 12, is multiplied with the weighting coefficient of the 1st-post feedback path provided by a coefficient unit Tap1a. The resulting signal is fed back to the adder 21 to equalize the waveform of the 1st-post path. An output of the decision circuit 12 on the 1st-post feedback path is not coupled to the latch circuit L2 of the other feedback path, output amplifier 32 or to the error detector 14, but is output to the adder 21 via just the coefficient unit Tap1a.

If desired to adaptively optimally control the weighting coefficients in the coefficient units Tap1a, Tap2 to Tapn, it is sufficient that a difference between data at the input and at the output of the decision circuit 11 is found by the error detector 14 to get the error signal ε. In such case, it is unnecessary that an error signal monitor function, which will turn out a load, is provided for the decision circuit 12 situated on the 1st-post feedback path.

Figure 10:
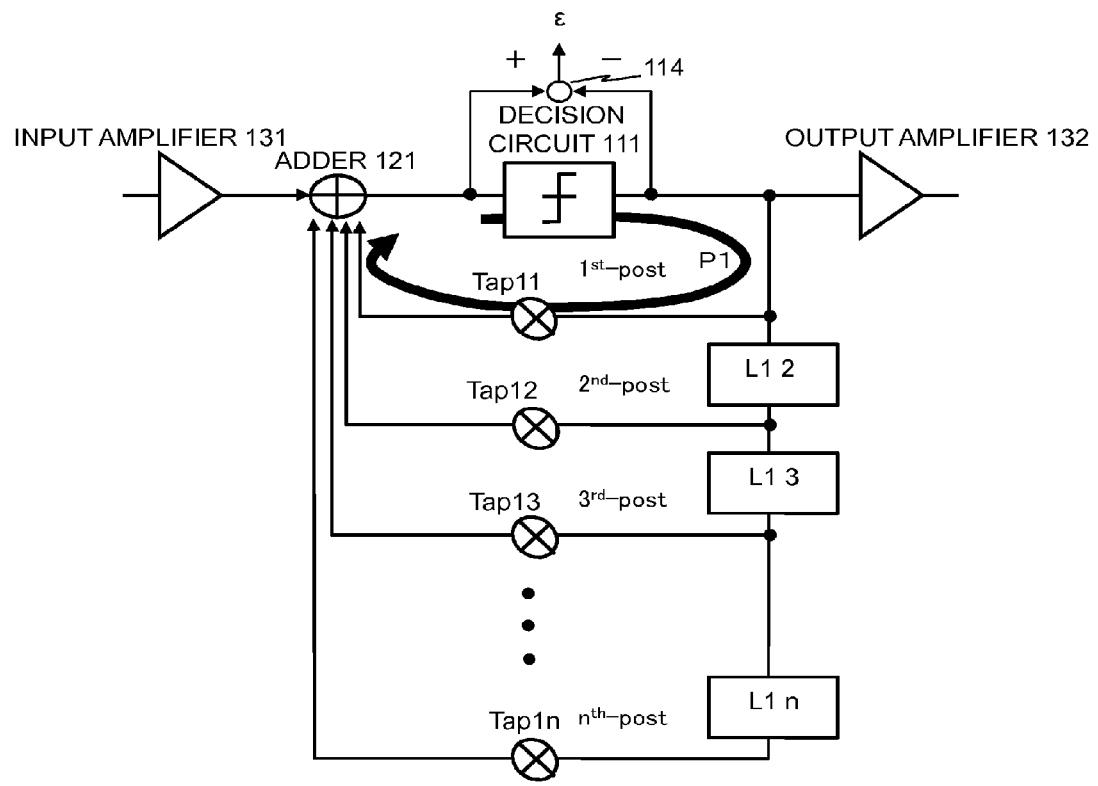
FIG. 10 is a block diagram showing a configuration of a conventional decision feedback equalizer.

In the decision feedback equalizer of FIG. 10, an output end of the decision circuit 111, constituting the 1st-post feedback path, is connected to a 1st-post feedback path (coefficient unit Tap11), a 2nd-post feedback path (latch circuit L12) and so forth and to an output path (output amplifier 132). Hence, the number of fan-outs is 3. If additionally the error detector 114 is provided, the number of fan-outs is as many as 4.

On the other hand, in the configuration of the present Example, the number of fan-outs of the decision circuit 12 of the 1st-post feedback path, provided as an independent path, is 1, indicating that the output load may be drastically lowered as compared to that of the conventional system. As a result, the delay time of the 1st-post feedback, which compromised the operating speed of the decision feedback equalizer in the conventional system, may now be reduced to enable a faster operation of the decision feedback equalizer.

Next, a more concrete circuit configuration of the decision feedback equalizer will be discussed. To assure a faster operation of the decision feedback equalizer, it is preferred that the signal that may be coped with by the equalizer is a differential signal excellent in noise-immunity. The explanation to follow is centered about the adder 21 and the decision circuits 11, 12 capable of coping with the differential signal. It is noted that one of the pair signals of the differential signal is designated with a slash '/' annexed to the other pair signal.

Figure 2:
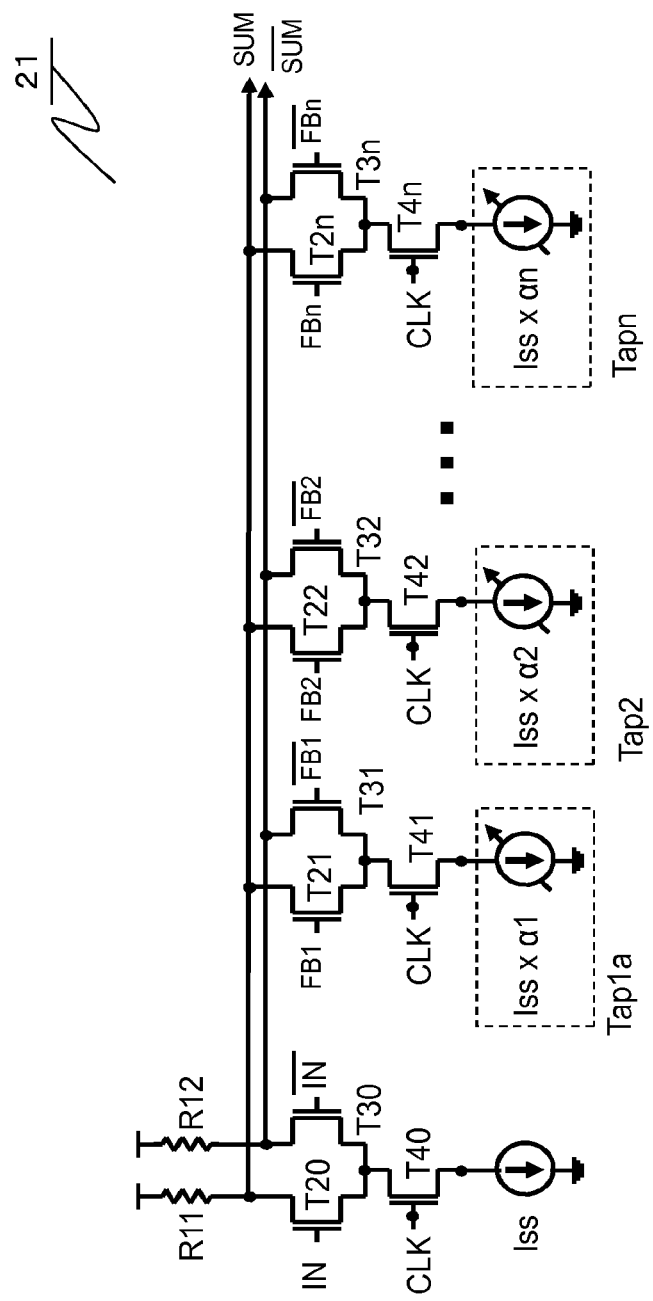
FIG. 2 is an example circuit diagram of an adder and coefficient units according to Example 1 of the present invention.

FIG. 2 depicts an example circuit diagram of the adder 21 and the coefficient units Tap1a and Tap2 to Tapn. The adder 21 includes Nch transistors T20 to T2n, T30 to T3n and T40 to T4n, resistors R11, R12 and a current source Iss. The coefficient units Tap1a and Tap2 to Tapn are equivalent to current sources that cause to flow the currents equal respectively to a1 to an times as much as the current of the current source Iss.

The Nch transistor T2k (k=0 to n) has its drain connected via resistor R11 to a power supply, while having its source connected to the drain of the Nch transistor T4k. The drain of the Nch transistor T2k outputs the signal SUM. The Nch transistor T3k has its drain connected via resistor R12 to the power supply, while having its source connected to the drain of the Nch transistor T4k. The drain of the Nch transistor T3k outputs the signal /SUM. The Nch transistor T3k forms a differential pair with the Nch transistor T2k.

The Nch transistor T20 has its gate fed with a signal IN, the Nch transistor T30 has its gate fed with a signal /IN. The Nch transistor T40 has its gate fed with a clock signal CLK, while having its source grounded via the current source Iss.

The Nch transistor T2k (k=1 to n) has its gate fed with the signal FBk, the Nch transistor T3k (k=1 to n) has its gate fed with the signal /FBk. The Nch transistor T4k (k=1 to n) has its gate fed with the clock signal CLK, while having its source grounded via the coefficient units Tap1a, Tap2 to Tapn, respectively.

In the adder 21 of the above mentioned configuration, the Nch transistors T40 to T4n are turned on during the HIGH level period of the clock signal CLK. In such case, the current of the current source Iss is distributed between the transistors T20 and T30 depending on the values of the signals IN and /IN. On the other hand, the current equal to αk times the current of the current source Iss is distributed between the transistors T2k and T3k depending on the values of the signals FBk, /FBk. Hence, the currents flowing through the Nch transistors T20 to T2n are summed together and the resulting sum current flows through the resistor R11. The currents flowing through the Nch transistors T30 to T3n are summed together and the resulting sum current flows through the resistor R12. The adder 21 operates as a weighting adder to output the result of the addition as the signals SUM and /SUM.

Figure 3:
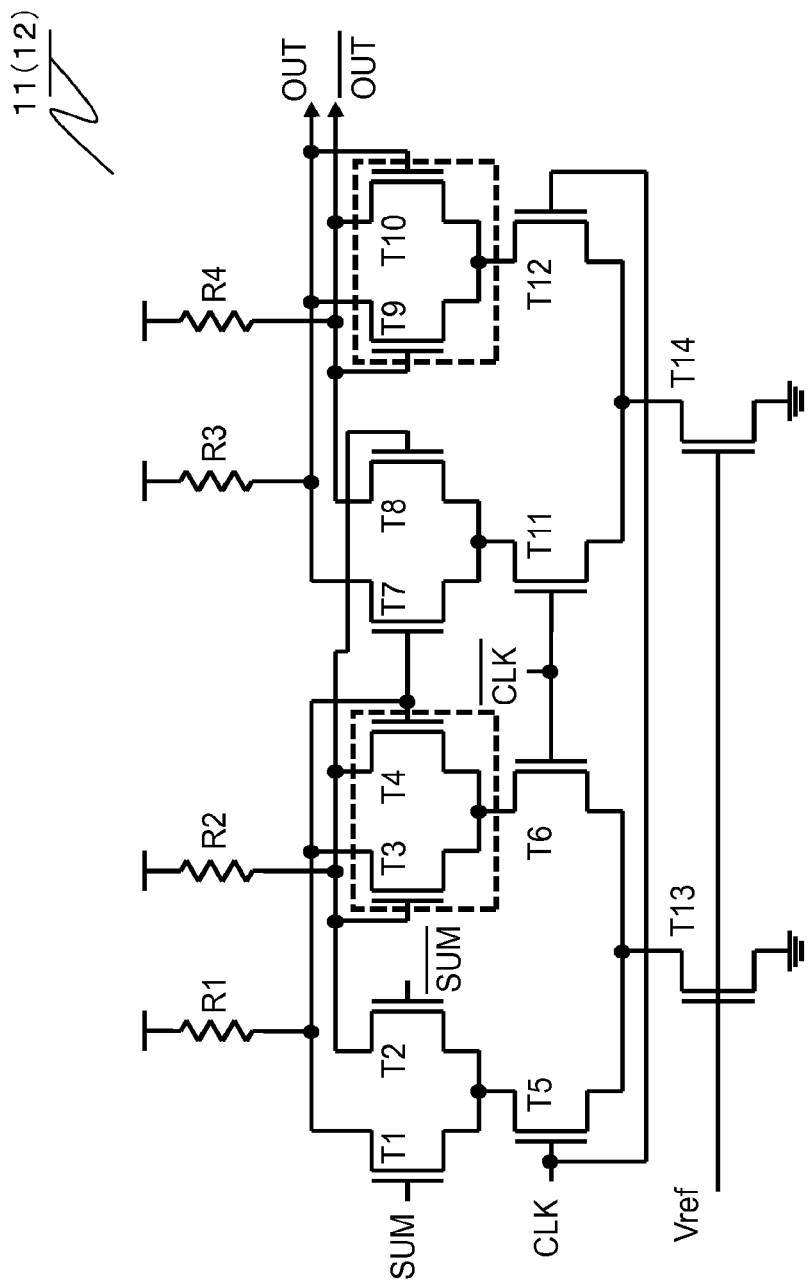
FIG. 3 is an example circuit diagram of the decision circuit according to Example 1 of the present invention.

FIG. 3 depicts an example circuit diagram of the decision circuits 11, 12. Each of the decision circuits 11, 12, which are of the same configuration, includes Nch transistors T1 to T14 and resistors R1 to R4.

The Nch transistor T1 has its drain connected to one end of the resistor R1, to the drain of the Nch transistor T3, to the gate of the Nch transistor T4 and to the gate of the Nch transistor T7. The other end of the resistor R1 is connected to a power supply. The Nch transistor T1 also has its source connected to the drain of the Nch transistor T5, while having its gate fed with the signal SUM. The Nch transistor T2 has its drain connected to one end of the resistor R2, to the drain of the Nch transistor T4, to the gate of the Nch transistor T3 and to the gate of the Nch transistor T8. The other end of the resistor R2 is connected to the power supply. The Nch transistor T2 also has its source connected to the drain of the Nch transistor T5, while having its gate fed with the signal /SUM. The Nch transistor T5 has its source connected to the drain of the Nch transistor T13, while having its gate fed with the clock signal CLK. The Nch transistors T3, T4 have sources connected common to the drain of the Nch transistor T6. The Nch transistor T6 has its source connected to the drain of the Nch transistor T13, while having its gate fed with a clock signal /CLK. The Nch transistor T13 has its source grounded, while having its gate fed with a reference voltage Vref.

The Nch transistor T7 has its drain connected to one end of a resistor R3, to the drain of the Nch transistor T9 and to the gate of the Nch transistor T10. The other end of the resistor R3 is connected to the power supply. The Nch transistor T7 has its source connected to the drain of the Nch transistor T11, and outputs a signal OUT at its drain. The Nch transistor T8 has its drain connected to one end of a resistor R4, to the drain of the Nch transistor T10 and to the gate of the Nch transistor T9. The other end of the resistor R4 is connected to the power supply. The Nch transistor T8 has its source connected to the drain of the Nch transistor T11, and outputs a signal /OUT at its drain. The Nch transistor T11 has its source connected to the drain of the Nch transistor T14, while having its gate fed with the clock signal /CLK. The Nch transistors T9, T10 have sources connected common to the drain of the Nch transistor T12. The Nch transistor T12 has its source connected to the drain of the Nch transistor T14, while having its gate fed with the clock signal CLK. The Nch transistor T14 has its source grounded, while having its gate fed with the reference voltage Vref.

The decision circuit 11 (12), described above, works as a CML (current mode logic) configuration master-slave flip-flop circuit. More specifically, the Nch transistors T1, T2 are activated when the clock signal CLK is HIGH to compare the levels of the signals SUM and /SUM, while the Nch transistors T3, T4 are activated when the clock signal CLK is LOW to hold the result of the comparison, thus constituting a master part of the flip-flop circuit. On the other hand, the Nch transistors T7, T8 are activated when the clock signal CLK is HIGH to amplify the data held by the Nch transistors T3, T4, while the Nch transistors T9, T10 are activated when the clock signal CLK is LOW to hold the amplified data to output the data as OUT, /OUT, thus constituting a slave part of the flip-flop circuit.

It is noted that circuit parameters in the decision circuit 12 are decided in consideration not only of the high-speed performance but also of the fact that the circuitry connected to the trailing side of the decision circuit is to be run in operation. In general, the high-speed performance and the driving capacity are in a relationship of trade-off to each other. In the decision feedback equalizer of FIG. 10, the number of fan-outs of the decision circuit is as many as 3 to 4, as set out above. Hence, the decision feedback equalizer suffers designing limitations that, to obtain the desired driving capacity, the transistor size of the constituent circuit needs to be larger even though the high-speed performance is compromised.

On the other hand, in the decision feedback equalizer of the present Example, circuit designing specialized in the high speed performance more strongly than heretofore is possible since the decision circuit 12 exists on an independent path with the number of fan-outs equal to unity. Specifically, the decision circuit 12 is designed with circuit constants different from those of the decision circuit 11 in order for the decision circuit 12 to operate at a higher speed than the decision circuit 11. In more concrete terms, the following example design scenarios (1) to (4) may be envisaged in connection with the circuit constants:

(1) The sizes of the transistors (T1 to T14) composing the decision circuit 12 are smaller than those of the transistors used in the decision circuit 11;
(2) the sizes of the transistors (T3, T4, T9, T10) of the data latch part composing the decision circuit 12 are smaller than those of the data latch part composing the decision circuit 11;
(3) the decision circuit 12 works with a logic amplitude smaller than that in the decision circuit 11; and
(4) the values of the load resistors (R1 to R4) constituting the decision circuit 12 are selected to be smaller than those of the load resistors composing the decision circuit 11 to suppress the logic amplitude.

Example 2

Example 1 is directed to the decision feedback equalizer of the full clock rate configuration. However, such is not to be construed in the limiting way. That is, the present invention may be applied to a decision feedback equalizer exploiting time interleaving that makes use of multi-clocks. The following describes an example circuit configuration in case of application of the present invention to the decision feedback equalizer of the half clock rate configuration equivalent to double time interleaving.

Figure 4:
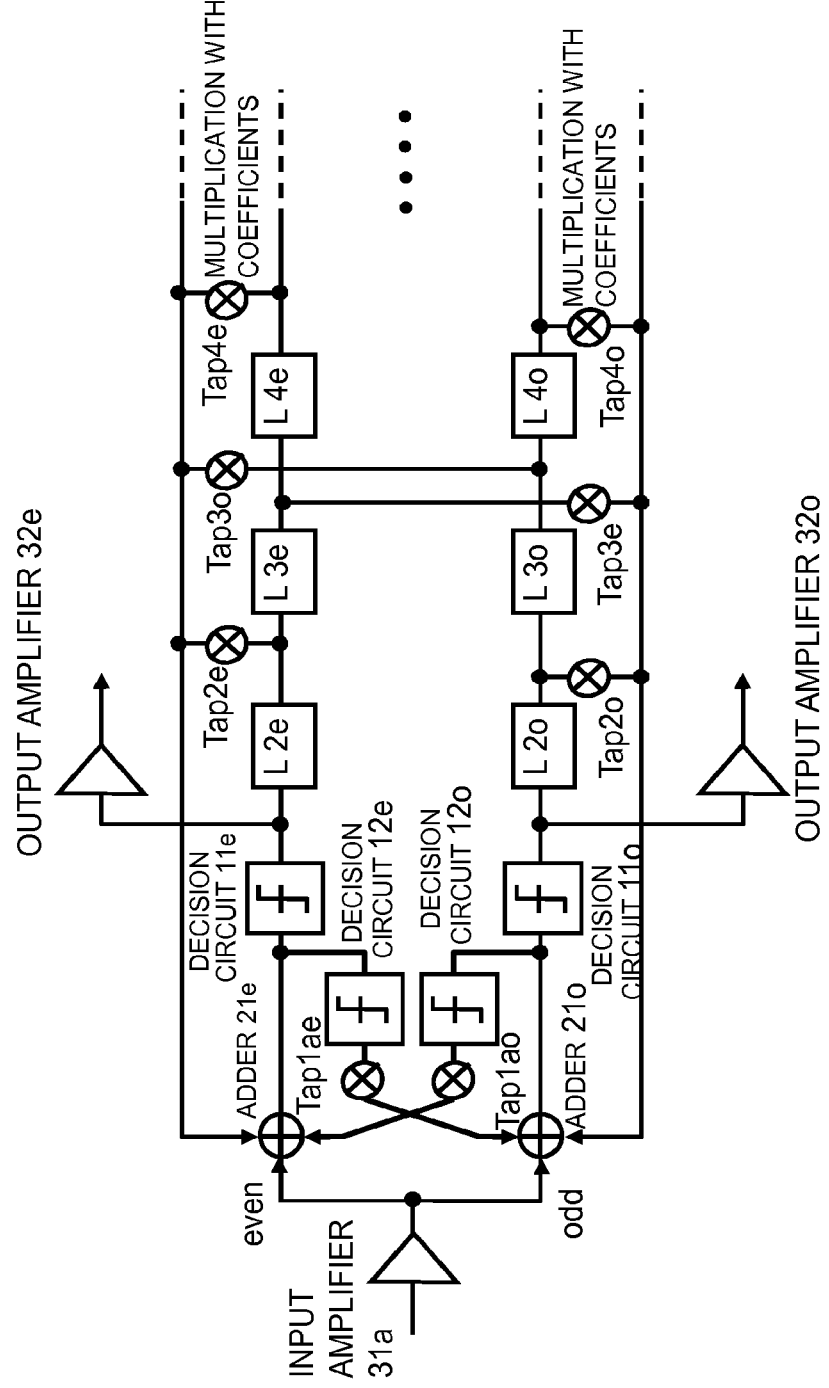
FIG. 4 is a block diagram showing a configuration of a decision feedback equalizer according to Example 2 of the present invention.

FIG. 4 depicts a block diagram showing a configuration of a decision feedback equalizer according to Example 2 of the present invention. In FIG. 4, the decision feedback equalizer includes decision circuits 11e, 11o, 12e, 12o, adders 21e, 21o, an input amplifier 31a, output amplifiers 32e, 32o, coefficient units Tap1ae, Tap1ao, Tap2e to Tapne, where n is an integer not less than 2, coefficient units Tap2o to Tapno and latch circuits L2e to Lne, L2o to Lno.

The input amplifier 31a divides a signal entered to the decision feedback equalizer into two portions which are distributed to the adders 21e, 21o. The adder 21e, decision circuits 11e, 12e, latch circuits L2e to Lne, output amplifier 32e and the coefficient units Tap1ae, Tap2e to Tapne are respectively equivalent to the adder 21, decision circuits 11, 12, latch circuits L2 to Ln, output amplifier 32 and the coefficient units Tap1a, Tap2 to Tapn of FIG. 1, and are in operation in like fashion in synchronism with one of the edges of the clock signal. The adder 21o, decision circuits 11o, 12o, latch circuits L2o to Lno, output amplifier 32o and the coefficient units Tap1ao, Tap2o to Tapno are respectively equivalent to the adder 21, decision circuits 11, 12, latch circuits L2 to Ln, output amplifier 32 and the coefficient units Tap1a, Tap2 to Tapn of FIG. 1, and are in operation in like fashion in synchronism with the other edge of the clock signal. It is noted that the adder 21e sums an output of the input amplifier 31a and outputs of the coefficient units Tap1ao, Tapke, k being an even number, and Tapmo, m being an odd number not less than 3, together to output the result to the decision circuits 11e, 12e. The adder 21o sums an output of the input amplifier 31a and outputs of the coefficient units Tap1ae, Tapke, k being an odd number not less than 3, and Tapmo, m being an even number, together to output the result to the decision circuits 11o, 12o.

The decision feedback equalizer, configured as described above, is a double-channel decision feedback equalizer operating at a rate twice the rate of the clock signal to equalize an output of the input amplifier 31a to deliver the equalized outputs alternately at the output amplifiers 32e, 32o. Hence, the present Example may implement a decision feedback equalizer of the half clock rate configuration capable of performing an operation at a higher speed.

Example 3

Figure 5:
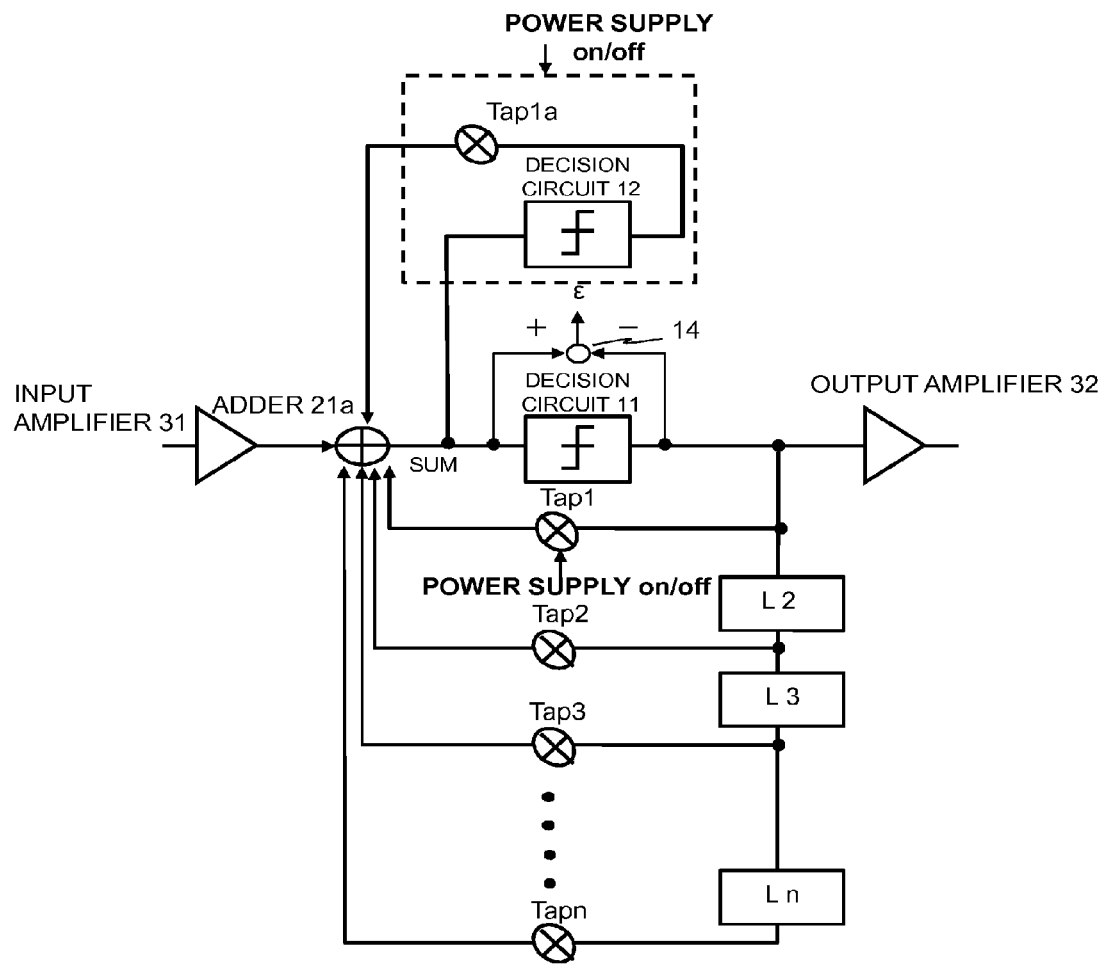
FIG. 5 is a block diagram showing a configuration of a decision feedback equalizer according to Example 3 of the present invention.

FIG. 5 depicts a block diagram showing the configuration of a decision feedback equalizer according to Example 3 of the present invention. It is noted that, in FIG. 5, the same symbols as those used in FIG. 1 denote the same components, and the corresponding explanation is dispensed with. The decision feedback equalizer of the present Example includes a coefficient unit Tap1, as compared to the configuration of FIG. 1. The coefficient unit Tap1 multiplies an output of the decision circuit 11 with a weighting coefficient to output the result to an adder 21a.

As compared to the configuration shown in Example 1, the decision feedback equalizer of the present Example includes a high-speed 1st-post feedback path corresponding to that provided in the decision feedback equalizer of FIG. 10. The present Example switches between the high-speed 1st-post feedback path and the conventional 1st-post feedback path depending on the state of the input signal. That is, the present Example includes an ordinary path that traverses the decision circuit 11 so as to return via the coefficient unit Tap1 to the adder 21a and a high-speed path that is branched from an output part of the adder 21a to traverse a decision circuit 12 and a coefficient unit Tap1a to return to the adder 21a. In this case, there are provided a function to exclusively turn off the power to the coefficient unit Tap1 and to the decision unit 12 and the coefficient unit Tap1a. By such exclusive power supply turn-off functions, the power supply for the high-speed path, made up by the decision unit 12 and the coefficient unit Tap1a, is turned off to make use only of the ordinary path, viz., coefficient unit Tap1, under the ordinary state, to enable the power-saving operation. If the input signal speed should be increased such that 1st-post feedback is unable be completed in time with the use of the ordinary path, with the error signal ε then surpassing a design value, the ordinary path is turned off to make use only of the high-speed path to enable the high-speed operation.

In the above described configuration of the decision feedback equalizer, it is possible to have the decision feedback equalizer operate in the power saving mode for the low-speed application or in the high speed mode for the high-speed application. That is, power scalability may be conferred on the decision feedback equalizer depending on the application.

Example 4

Figure 6:
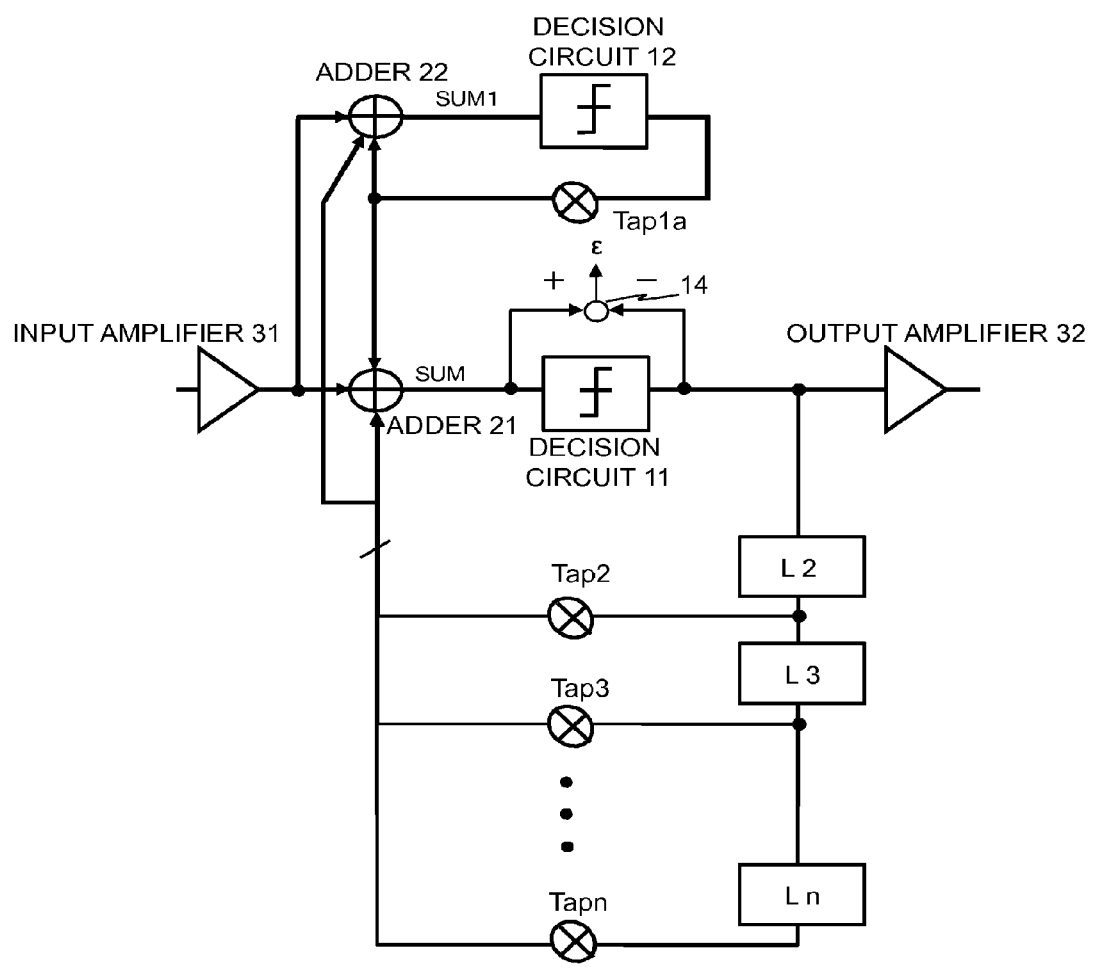
FIG. 6 is a block diagram showing a configuration of a decision feedback equalizer according to Example 4 of the present invention.

FIG. 6 depicts a block diagram showing the configuration of a decision feedback equalizer according to Example 4 of the present invention. It is noted that, in FIG. 6, the same symbols as those used in FIG. 1 denote the same components, and the corresponding explanation is dispensed with. The decision feedback equalizer of the present Example further includes an adder 22 that adds together the signal IN and signals corresponding to the feedback signals FB1 to FBn, as weighted by the coefficient units Tap1a, Tap2 to Tapn, respectively, to output a signal resulting from the addition to the decision circuit 12. The decision circuit 12 checks the output of the adder 22.

In contrast to the configuration of the decision feedback equalizer of Example 1, in which an output part of the adder 21 is divided into two portions, one of which is to operate as a high-speed feedback path devoted to the 1st-post, output branching in the present Example is at a pre-stage part of the adder 21. That is, the signal IN is divided into two signal portions, and the adder 21 as well as the decision circuit 11 is provided in association with one of the signal portions, while the adder 22 as well as the decision circuit 12 is provided in association with the other signal portion.

One of the branched signal portions of the signal IN is formed by the adder 21, the decision circuit 11, a feedback delay circuit made up by respective latch stages of the 2nd-post and so forth, and coefficient units Tap2 to Tapn. The 2nd-post feedback path and so forth of the signal portion is multiplied by corresponding coefficients to remove the ISI in the 2nd-post feedback path and so forth before being fed back to the adders 21, 22.

The other branched portion of the signal IN is formed by a high-speed feedback path that is devoted to the 1st-post and which is made up by the adder 22, decision circuit 12 and the coefficient unit Tap1a. The signal portion of the 1st-post is multiplied with the corresponding coefficient to remove the ISI of the 1st-post before being fed back to the adders 21, 22.

Thus, from the pre-stage of the adder 22, the feedback path, devoted to the 1st-post, is provided as an independent branched path. Hence, the number of fan-outs of the decision circuit 12 of the 1st-post feedback path is 2, thus reducing the output load in comparison with the conventional system with 3 to 4 fan-outs. As a result, the delay time of the 1st post, which compromised the operating speed of the decision feedback equalizer, may be reduced to provide for a higher operating speed of the decision feedback equalizer.

Moreover, since the adder 22 outputs the result of the addition to just the decision circuit 12, it may be composed by a transistor smaller in size than that of the adder 21, thus allowing a faster additive operation and suppressing the input branching load from increasing.

Example 5

Figure 7:
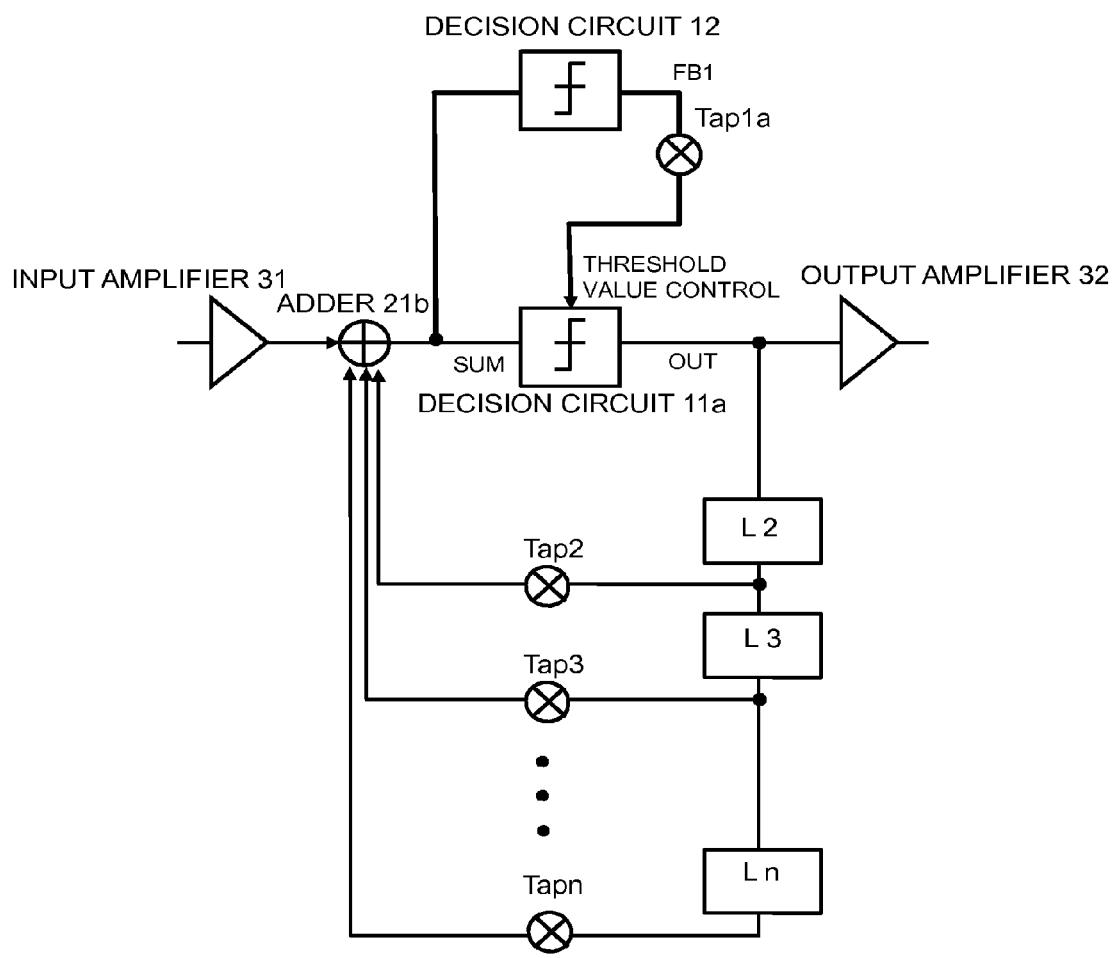
FIG. 7 is a block diagram showing a configuration of a decision feedback equalizer according to Example 5 of the present invention.

FIG. 7 depicts a block diagram showing the configuration of a decision feedback equalizer according to Example 5 of the present invention. It is noted that, in FIG. 7, the same symbols as those used in FIG. 1 denote the same components, and the corresponding explanation is dispensed with. The decision feedback equalizer of the present Example includes, in place of the decision circuit 11, a decision circuit 11*a* with a controllable threshold value. A feedback signal FB1, output from the decision circuit 12, is not entered to an adder 21*b*, but is entered via coefficient unit Tap1*a* to a threshold control terminal of the decision circuit 11*a*.

In contrast to the decision feedback equalizer of Example 1, the decision feedback equalizer of the present Example uses the 1st-post in order to control the level of the data decision threshold value of the decision circuit 11*a* without feeding back the 1st-post to the adder 21*b*. That is, one of two output parts divided from the output signal of the adder 21*b* is to form a decision feedback processing block for the 2nd-post path and so forth, and is made up of the decision circuit 11*a*, a feedback delay circuit formed by a plurality of latch stages for the 2nd-post path and so forth, and coefficient multipliers of Tap 2 and so forth. The divided signal part on the 2nd-post path and so forth is multiplied with corresponding coefficients so as to be then fed back to the adder 21*b* to remove the ISI of the 2nd-post and so forth.

The other output part divided from the output of the adder 21*b* is made up by the decision circuit 12 and the coefficient unit Tap1*a*, for operation as the high-speed feedback path devoted to the 1st-post. The other output part multiplies the output of the decision circuit 12 with a tap coefficient to deliver the result to a threshold control terminal of the decision circuit 11*a*. For example, if the result of the decision circuit 12 is "1", the threshold value level of the decision circuit 11*a* is adjusted in a direction to remove the ISI on the 1st-post path. If the result of the decision circuit 12 is "0", the threshold value level of the decision circuit 11*a* is either unchanged or adjusted in the reverse direction. Such operation of increasing/decreasing the threshold value of the decision circuit 11*a* depending on the decision result 1/0 of the temporally previous data is tantamount to the data adding/subtracting operation at the adder 21*b* and thus implements the decision feedback equalizing operation.

Figure 8:
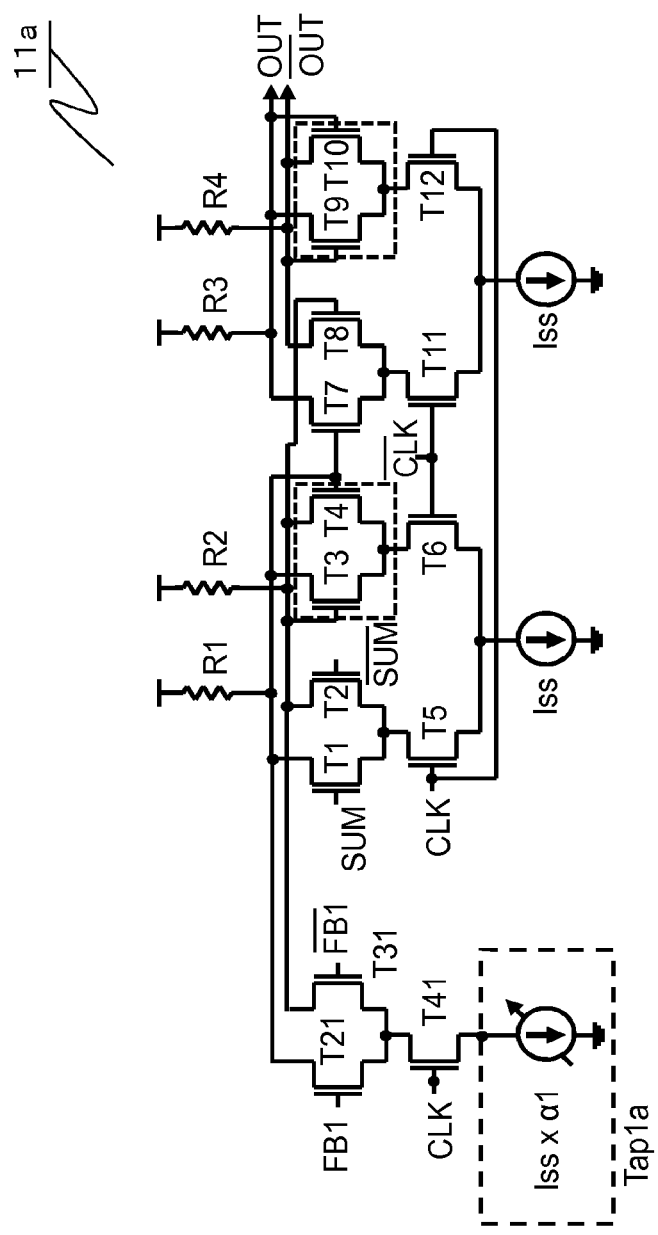
FIG. 8 is an example circuit diagram of the decision circuit according to Example 5 of the present invention.

A concrete example circuit of the decision circuit 11*a* will now be described. FIG. 8 shows such example circuit of the decision circuit 11*a*. It is noted that the same symbols as those used in FIG. 2 and FIG. 3 denote the same components, and the corresponding explanation is dispensed with. In the decision circuit 11*a*, the drain of a Nch transistor T21 is connected to the drain of a Nch transistor T1, the drain of a Nch transistor T31 is connected to the drain of a Nch transistor T2. It is noted that the Nch transistors T13, T14 shown in FIG. 3 are each represented in FIG. 8 by a current source Iss.

If, in such decision circuit 11*a*, the clock signal CLK is HIGH, the Nch transistors T41, T5, T12 are turned on. In such case, the currents equal to a1 times the current of the current source Iss, flowing in the coefficient unit Tap1*a*, is distributed between the Nch transistors T21, T31 depending on the signals FB1, /FB1. On the other hand, the current of the current source Iss is distributed between the transistors T1 and T2 depending on the values of the signals SUM, /SUM. Hence, the current flowing through the Nch transistor T21 is summed to the current flowing through the Nch transistor T1, and the resulting sum current flows through the resistor R1. On the other hand, the current flowing through the Nch transistor T31 is summed to the current flowing through the Nch transistor T2, and the resulting sum current flows through the resistor R2. As a result, if the signal FB1 is "1", the threshold value level of the decision circuit 11*a* is adjusted in a direction to remove the ISI of the 1st-post path. If the signal FB1 is "0", the threshold value level of the decision circuit 11*a* is unchanged. Thus, the threshold value of the decision circuit 11*a* may be controlled depending on the signals FB1 and /FB1.

In the above described configuration of the decision feedback equalizer, the number of fan-outs of the decision circuit 12 is 1. Thus, as compared to the conventional decision feedback equalizer, with 3 to 4 fan-outs, it is possible with the present Example to reduce the load on the 1st-post feedback path to elevate the operating speed. In addition, the output of the 1st-post is not fed back to the adder 21*b*, thus further elevating the operating speed.

It is noted however that, strictly speaking, the 1st-post path in the present configuration does not form a feedback loop, so that, in the data decision processing by the decision circuit 12, the ISI of the 1st-post path is not removed. There is thus a fear of deterioration, even if only slight, of the waveform equalizing processing. The following Example gives a solution in regard to this point.

Example 6

Figure 9:
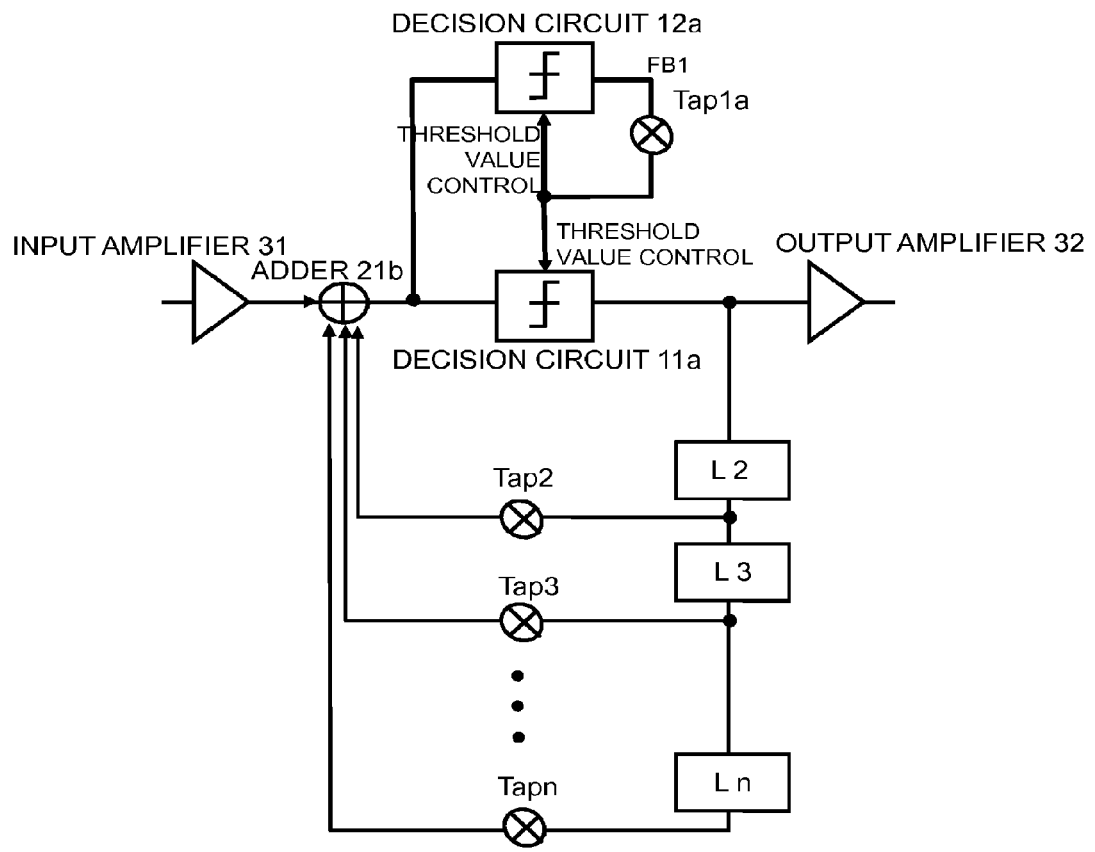
FIG. 9 is a block diagram showing a configuration of a decision feedback equalizer according to Example 6 of the present invention.

FIG. 9 depicts a block diagram showing the configuration of a decision feedback equalizer according to Example 6 of the present invention. In FIG. 9, the same symbols as those used in FIG. 7 denote the same components, and the corresponding explanation is dispensed with. The decision feedback equalizer of the present Example includes, in place of the decision circuit 12 of FIG. 7, a decision circuit 12*a* whose threshold value may be controlled by an output of a coefficient unit Tap1*a*. The decision circuit 12*a* has a configuration like that of the decision circuit 11*a* shown in FIG. 8. It is noted however that, as set out above in connection with Example 1, the circuit constants used in the decision circuit 12*a* differ from those used in the decision circuit 11*a* in order that the speed of operation of the decision circuit 12*a* will be higher than that of the decision circuit 11*a*. The adder 21*b* sums the signal IN to the feedback signals FB2 to FBn, weighted respectively by the coefficient units Tap2 to Tapn, and outputs a signal corresponding to the result of the addition to the decision units 11*a*, 12*a*.

In the above indicated configuration, the output of the decision circuit 12*a*, devoted to the 1st-post feedback path, is fed back to the threshold control terminal of each of the decision circuits 11*a* and 12*a*. By feeding back to the threshold control terminal of the decision circuit 12*a* as well, the 1st-post path also may be reliably equalized to overcome the problem referred to in connection with Example 5. Although the number of fan-outs of the decision circuit 12*a* is now 2, it is possible to reduce the load as compared to the conventional decision feedback equalizer with 3 or 4 fan-outs.

The decision feedback equalizer of the present Example may operate at a faster speed in that the output of the decision circuit 12a is not fed back to the adder 21b.

The decision feedback equalizer of each of the above described Examples may be used to advantage in high-speed communication interfaces, such as USB, PCIe or serial ATA, in communication equipment in need of the communication interfaces, or in PC peripherals. The following gives certain Examples of application of the decision feedback equalizer of the present invention.

Example 7

Figure 11:
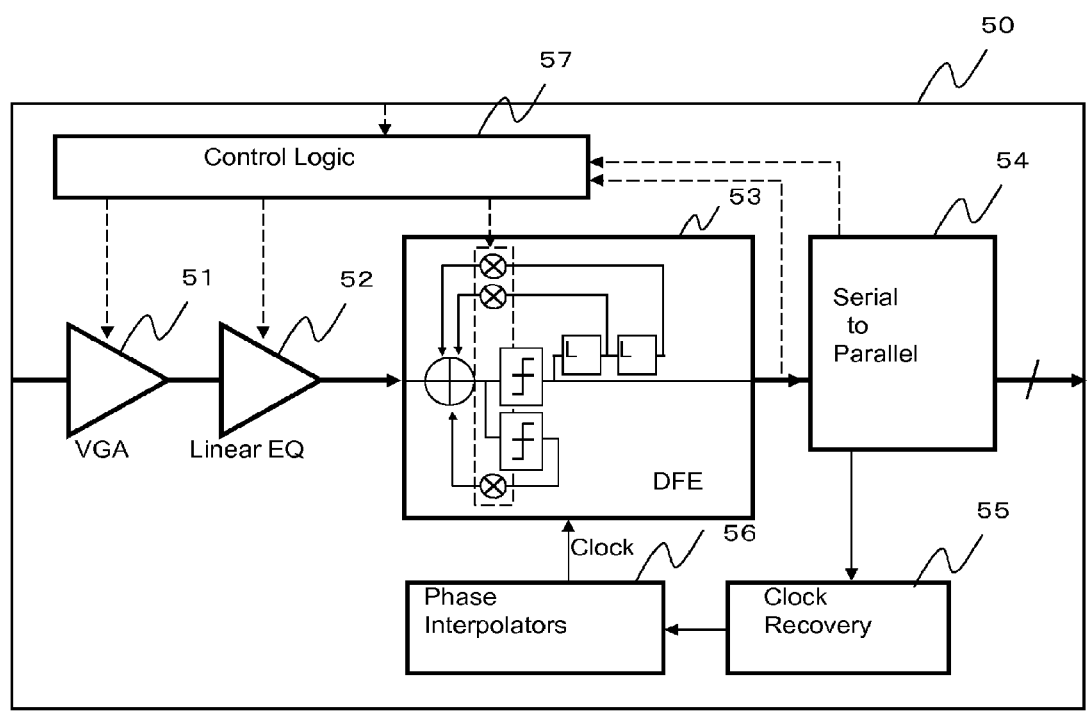
FIG. 11 is a block diagram showing a configuration of a receiver according to Example 7 of the present invention.

FIG. 11 depicts a block diagram showing a configuration of a receiver according to Example 7 of the present invention. In FIG. 11, a receiver 50 includes a variable gain amplifier 51, a linear equalizer 52, a decision feedback equalizer 53, a serial-to-parallel converter 54, a clock recovery circuit 55, a phase interpolator 56 and a control circuit 57.

The variable gain amplifier 51 amplifies an input signal, that is, a received signal, with a gain as set by the control circuit 57, and outputs the resulting amplified signal to the linear equalizer 52. The linear equalizer 52 equalizes the output signal of the variable gain amplifier 51, based on a peaking location as set by the control circuit 57, or on the value of equalization, and outputs the resulting equalized signal to the decision feedback equalizer 53. The decision feedback equalizer 53 is that shown and described above with reference to Examples 1 to 6, and equalizes the output signal of the linear equalizer 52 to output the resulting equalized signal to the serial-to-parallel converter 54. The serial-to-parallel converter 54, made up by, for example, a shift register, converts the serial input signal into parallel data, which is then output to outside as received signal.

The clock recovery circuit 55 recovers a clock signal, based on the signal processed by the serial-to-parallel converter 54, and outputs the recovered clock signal to the phase interpolator 56. The phase interpolator 56 adjusts the phase of the recovered clock signal to generate operating clocks for the decision feedback equalizer 53, and outputs the so generated operating clocks to the decision feedback equalizer 53. The control circuit 57 outputs the gain of the variable gain amplifier 51 to the variable gain amplifier 51, while outputting the peaking location or the value of equalization in the linear equalizer 52 to the linear equalizer 52 and outputting the values of the coefficient units in the decision feedback equalizer 53 to the decision feedback equalizer 53. It is also possible for the control circuit 57 to set these values based on the information supplied from outside or by referring to error occurrences in the output signal of the decision feedback equalizer 53 or in the output signal of the serial-to-parallel converter 54.

In the receiver 50 of the above described configuration, in which the decision feedback equalizer shown in the Examples 1 to 6 is used as the decision feedback equalizer 53, the operation with a higher operating speed may be realized.

Example 8

Figure 12:
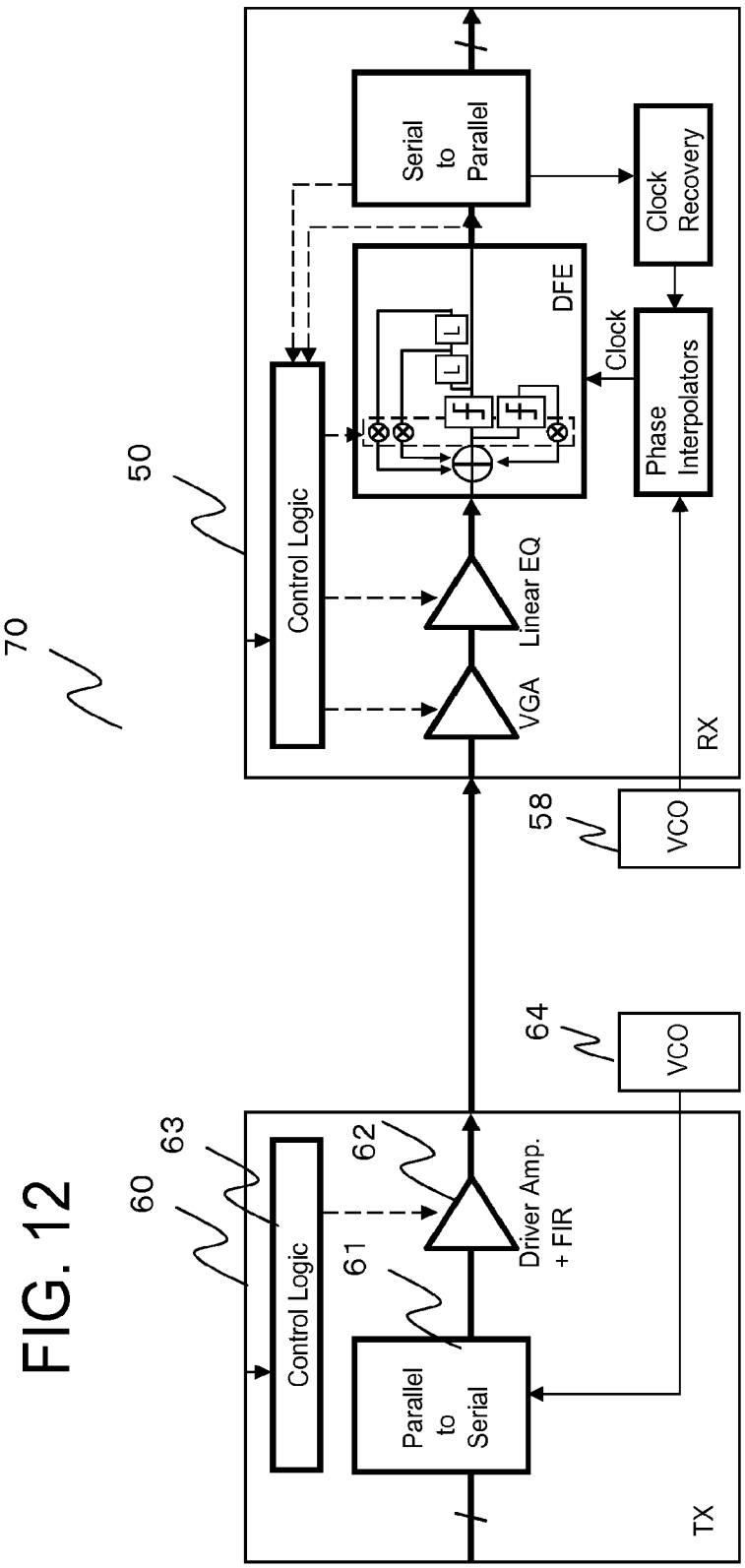
FIG. 12 is a block diagram showing a configuration of a communication system according to Example 8 of the present invention.

FIG. 12 depicts a block diagram showing the configuration of a communication system according to Example 8 of the present invention. In FIG. 12, a communication system 70 includes the receiver 50, as indicated in connection with the above Example 7, voltage controlled oscillators 58, 64 and a transmitter 60. The transmitter 60 includes a parallel-to-serial converter 61, an amplifier 62 and a control circuit 63.

The voltage controlled oscillator 58 generates a clock signal for the receiver 50. A phase interpolator 56 within the receiver 50 adjusts the phase of the clock signal, generated by the voltage controlled oscillator 58, by having reference to the phase of the clock recovery circuit 55.

The parallel-to-serial converter 61 converts parallel signals, delivered from outside for transmission, into a serial signal which is output to the amplifier 62. The amplifier 62 includes inter alia a FIR filter to output an appropriately bandwidth limited amplified transmission signal to the receiver 50. The voltage controlled oscillator 64 generates a clock signal for the transmitter 60, the parallel-to-serial converter 61 performing a conversion operation based on the generated clock signal. The control circuit 63 sets the gain or the bandwidth for the amplifier 62. It is possible for the control circuit 63 to set these setting values based on the information supplied from outside.

Like the system of Example 7, the communication system 70 of the above described configuration is able to perform a faster operation.

Example 9

Figure 13:
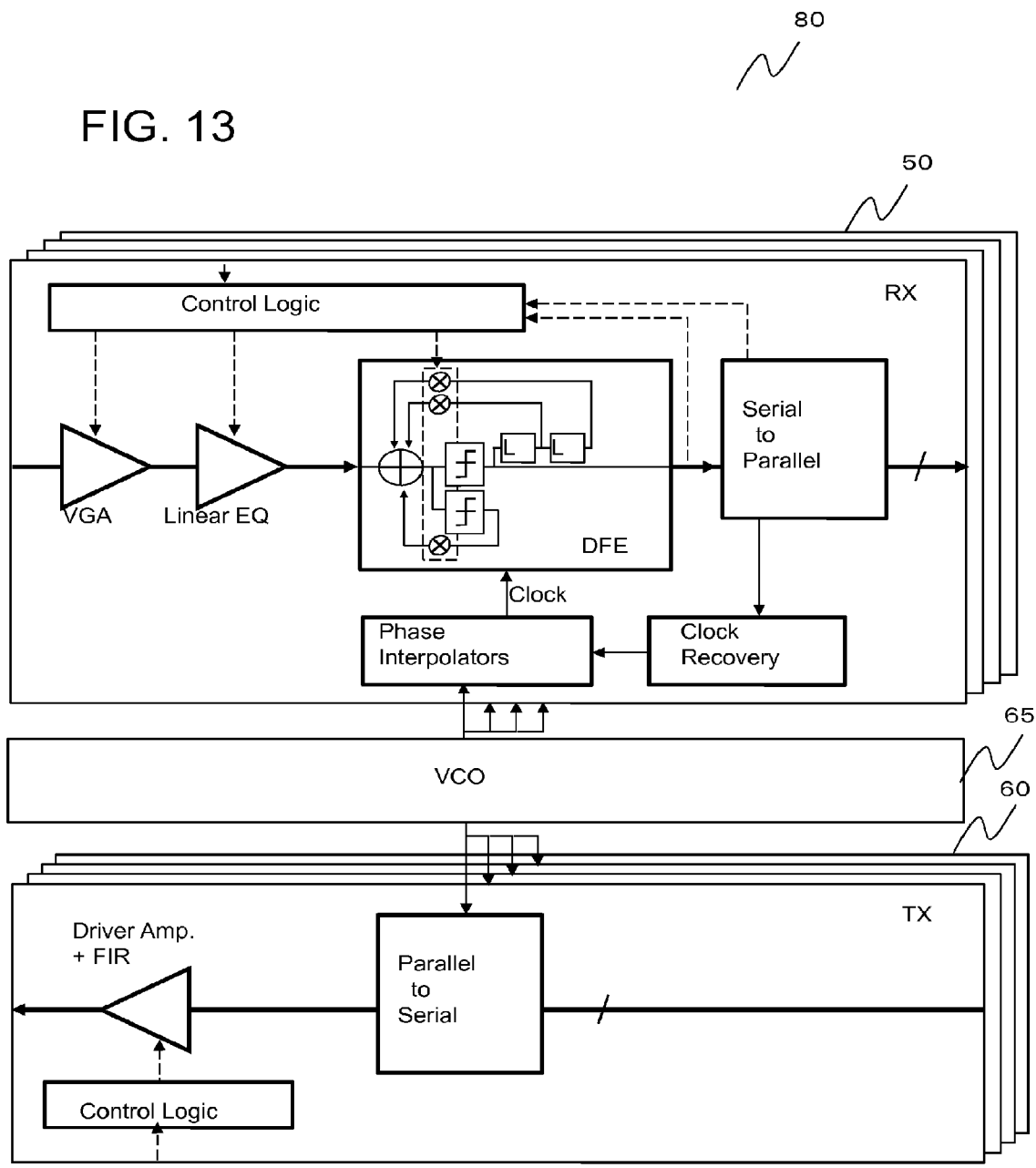
FIG. 13 is a block diagram showing a configuration of a semiconductor device according to Example 9 of the present invention.

FIG. 13 depicts a block diagram showing the configuration of a semiconductor device according to Example 9 of the present invention. In FIG. 13, the semiconductor device 80 includes four of the receivers 50, as set out in Example 7, four of the transmitters 60, as set out in Example 8, and a voltage-controlled oscillator 65.

The voltage-controlled oscillator 65 is equivalent to the voltage-controlled oscillators 58, 64, as set out in Example 8, and delivers a clock signal to the four receivers 50 and the four transmitters 60.

The semiconductor device 80 of the above described configuration is able to perform a faster operation, like the system of Example 7. It is noted that the semiconductor device uses the four receivers 50 and the four transmitters 60 only by way of illustration and may also use one or other plural numbers of the receivers or the transmitters.

The Examples given above may be modified or adjusted within the gamut of the entire disclosure of the present invention, inclusive of claims, based on the fundamental technical concept of the invention. Further, various combinations or selection of elements disclosed herein may be made within the concept of the claims. The present invention may encompass various variations or modifications that may occur to those skilled in the art in accordance with the gamut of the entire disclosure of the present invention, inclusive of claim and the technical concept of the present invention.

It should be noted that, although the critical date for the matter added in the present PCT application is the date of filing of the PCT application, the critical date for the matter described in the original priority documents is to be determined based on the priority date in accordance with the regulations of the right of priority under the Paris Convention and hence is not to be affected in any way by the matter added at a later date.

EXPLANATION OF SYMBOLS 11, 11a, 11e, 11o, 12, 12a, 12e, 12o decision circuits
14 error detector
21, 21a, 21b, 21e, 21o, 22 adders
31, 31a input amplifiers
32, 32e, 32o output amplifiers
Iss current source
L2~Ln, L2e~Lne, L2o~Lno latch circuits R1~R4, R11, R12 resistors
T1~T14, T20~T2n, T30~T3n, T40~T4n Nch transistors
Tap1a, Tap1~Tapn, Tap1ae, Tap1ao, Tap2e~Tapne, Tap2o~Tapno coefficient units
50 receiver
51 variable gain amplifier
52 linear equalizer
53 decision feedback equalizer
54 serial-to-parallel converter
55 clock recovery circuit
56 phase interpolator
57, 63 control circuits
58, 64, 65 voltage-controlled oscillators
60 transmitter
61 parallel-to-serial converter
62 amplifier
70 communication system
80 semiconductor device

The invention claimed is:

1. A decision feedback equalizer, comprising:
   a first weighting addition circuit that adds an input signal and weighted versions of second to nth feedback signals together, n being an integer not less than 2;
   a first decision circuit that decides whether or not a result of addition by the first weighting addition circuit is not less than a first defined threshold value and that outputs the result of the decision as a first feedback signal of the n feedback signals, the first decision circuit operating in synchronism with a clock signal;
   a second decision circuit that decides whether or not the result of the addition by the first weighting addition circuit is not less than a second defined threshold value and that outputs the result of the decision, the second decision circuit operating in synchronism with the clock signal; and
   a plurality of latch circuits that sequentially hold the result of decision of the second decision circuit in synchronism with the clock signal and that output the contents held by component registers thereof as the second to nth feedback signals, respectively,
   wherein the second decision circuit is configured so that the second defined threshold value is controllable by a weighted version of the first feedback signal.

2. The decision feedback equalizer according to claim 1, wherein
   the first decision circuit is configured so that the first defined threshold value is controllable by the weighted version of the first feedback signal.

3. The decision feedback equalizer according to claim 1, wherein
   the first decision circuit is constructed with circuit constants different from those of the second decision circuit so that the first decision circuit will operate at a speed faster than the second decision circuit.

4. The decision feedback equalizer according to claim 2, at least a part of transistors of the first decision circuit having a size smaller than transistors of the second decision circuit.

5. The decision feedback equalizer according to claim 3, wherein
   the first decision circuit and the second decision circuit each include a data holding part that holds the result of the addition and that operates with the clock signal, and
   a transistor of the data holding part of the first decision circuit is smaller in size than a transistor of the data holding part of the second decision circuit.

6. The decision feedback equalizer according to claim 2, wherein
   the first decision circuit is configured to operate with a logical amplitude less than that of the second decision circuit.

7. The decision feedback equalizer according to claim 2, wherein
   the first decision circuit and the second decision circuit each include a data holding part that holds the result of the addition and that operates with the clock signal, and
   a load resistor of the data holding part of the first decision circuit has a resistance value lower than that of a load resistor of the data holding part of the second decision circuit.

8. A receiver including the decision feedback equalizer according to claim 1.

9. A communication system including the receiver according to claim 8 and a transmitter configured to send out a transmission signal to the receiver.

10. A semiconductor device including at least one receiver according to claim 8.

* * * * *